United States Patent [19]

Regutti

[11] Patent Number: 4,880,652
[45] Date of Patent: Nov. 14, 1989

[54] METHOD OF FILTERING EDIBLE LIQUIDS

[75] Inventor: Robert Regutti, Bridgeview, Ill.

[73] Assignee: GyCor International Ltd., Bridgeview, Ill.

[21] Appl. No.: 128,735

[22] Filed: Dec. 4, 1987

[51] Int. Cl.4 .................. A23L 1/01; A23L 1/015; A23D 5/04

[52] U.S. Cl. .................. 426/417; 210/282; 210/484; 426/422; 426/423; 426/438

[58] Field of Search .................. 260/427, 428, 420; 426/417, 423, 438, 422; 210/282, 484

[56] References Cited

U.S. PATENT DOCUMENTS

| | | | |
|---|---|---|---|
| 3,231,390 | 1/1966 | Hoover | 260/427 |
| 3,436,345 | 4/1969 | Goodenough et al. | 210/282 |
| 3,735,871 | 5/1973 | Bisko | 210/484 |
| 4,112,129 | 9/1978 | Duensing et al. | 426/417 |
| 4,125,482 | 11/1978 | Sinha | 260/428 |
| 4,150,045 | 4/1979 | Sinha | 260/427 |
| 4,235,795 | 11/1980 | Cohen | 426/423 |
| 4,330,564 | 5/1982 | Friedman | 426/423 |
| 4,629,588 | 12/1986 | Welsh et al. | 260/428 |
| 4,681,768 | 7/1987 | Mulflur et al. | 426/417 |
| 4,707,263 | 11/1987 | Nishimori et al. | 210/484 |
| 4,721,624 | 1/1988 | Schumann | 210/282 |
| 4,734,226 | 3/1988 | Parker et al. | 260/428 |

FOREIGN PATENT DOCUMENTS

| | | | |
|---|---|---|---|
| 0042294 | 12/1951 | European Pat. Off. | 426/423 |
| 3320065 | 12/1984 | Fed. Rep. of Germany | 210/282 |
| 48411 | 11/1984 | Japan | 426/423 |
| 48705 | 5/1987 | Japan | 260/427 |

Primary Examiner—Peter Kratz
Attorney, Agent, or Firm—Burmeister, York, Palmatier & Zummer

[57] ABSTRACT

The disclosed process provides for the treatment of edible cooking oils with a closed packet containing hydrated filtering material to absorb unwanted constituents.

10 Claims, 1 Drawing Sheet

METHOD OF FILTERING EDIBLE LIQUIDS

The present invention relates to methods of filtering undesirable taste constituents from edible liquids. The present invention also relates to filter media for use in such methods and to filtering devices for carrying out such methods.

BACKGROUND OF THE INVENTION

There are many food processes which can benefit from the use of a filter for purifying, clarifying, improving, and reclaiming edible liquids. The present invention is applicable to all such processes, such as reclaiming cooking oil in restaurants, and clarifying and improving the taste of wine.

Prior to the present invention, many restaurants have periodically passed the cooking oil used for deep fat frying through a porous pad in order to remove food particles. Such filtering, however, did not prevent the build-up of oil degradation products, like fatty acids, polymers, non-volatiles, volatiles and coloring bodies which adversely affect the taste and color of foods fried in such oil. Various efforts have been made to remove such acids and bodies from used cooking oil. U.S. Pat. No. 4,330,565 entitled "FRYER OIL TREATMENT COMPOSITION AND METHOD" issued to Friedman on May 18, 1982, discloses use of a composition of water, a food compatible acid, such as citric acid, tartaric acid, acetic acid, phosphoric acid or malic acid, and a carrier containing rhyolite or perlite. The carrier of Friedman may also contain in addition to the rhyolite or perlite; activated carbon, fuller's earth, silica gel, bauxite, alumina, and diatomaceous earth. U.S. Pat. No. 4,112,129 of Duensing et al entitled "COOKING OIL TREATING SYSTEM AND COMPOSITION THEREFOR" dated Sept. 5, 1978, discloses a filter composition for the same purpose of diatomite, synthetic calcium silicate hydrate, and synthetic magnesium silicate hydrate. In these processes and the process of copending U.S. Pat. No. 4,764,384, of John Gyann filed Apr. 3, 1986, entitled FILTERING MEDIA AND METHOD OF USING SAME, under common assignment with the present application, granulated filtering material is added to hot cooking oil to absorb unwanted taste constituents therefrom, and thereafter the filtering media is mechanically filtered from the cooking oil, thereby rejuvenating the cooking oil. In the practice of such processes, the cooking oil is generally filtered through a layer of filter paper to remove solid particles of food which may be present in the cooking oil and to remove the filter media itself. A filtering aid is generally employed with the filtering media to facilitate the flow of the cooking oil through the media to the paper filter.

Not all fast food restaurants utilize mechanical filter equipment to remove particles of food from the deep fat cooking oil. The processes disclosed above cannot be used in such fast food restaurants or require the addition of mechanical filtering equipment. It is an object of the present invention to provide a process for removing unwanted taste constituents from a liquid which does not require mechanical filtration equipment.

In some fast food restaurants, filtering of the filter media from the cooking oil by a mechanical filter fails to remove all of the filter media. As a result, the cooking oil becomes contaminated by filter media, and the filter media represents an undesirable additive to the rejuvenated cooking oil. Faulty mechanical filtering equipment can result in this condition of the rejuvenated cooking oil. It is a further object of the present invention to provide a process for filtering edible liquids which significantly reduces the possibility of contamination of the edible liquid by the filter media.

The filter media disclosed in U.S. Pat. No. 4,764,384 of John Gyann referred to above utilizes hydrated synthetic amorphous silica and synthetic amorphous magnesium silicate as its principal active agents, but a filter media limited to these active agents results in a slow mechanical filtration process. To increase the speed of filtration, a filtering aid is utilized, and the filter media disclosed in said patent application is diatomaceous earth, diatomaceous earth being selected because it also contributes to filtration. As a result, more filter media must be admixed with the cooking oil to produce satisfactory removal of unwanted taste constituents.

Duensing U.S. Pat. No. 4,112,129 seeks to create adequate flow rates in a filter medium of diatomite, synthetic calcium silicate hydrate, and synthetic magnesium silicate hydrate by control of particle size, but the particle size requirement makes it necessary to use more coarse materials than are conventionally available. It is an object of the present invention to eliminate or reduce the need for a filter aid, or to select materials of unconventional particle size, in the filter media utilized to remove unwanted taste constituents from an edible liquid.

The inventor has found that it is desirable to add some ingredient to the edible liquid, such as an antioxidant, which will remain in the liquid after treatment. It is a further object of the present invention to add ingredients to the edible liquid simultaneously with the filtration process.

It is a further objection of the present invention to provide an improved filtering media for use with edible liquids, particularly such a filtering media which is particularly suited for use in packets according to the present invention.

THE INVENTION

The inventor has achieved the foregoing objects of the present invention by utilizing filter media in the form of a porous mass in packets, the packets having walls which are permeable to the edible liquid to be filtered and impermeable to the filter media disposed within the packet. The size of the packets is selected to limit the quantity of the filter media within the packet to a quantity which will permit all portions of the filter media in the packet to have good contact with the edible liquid. The packets have advantages over a mere mass of granulated filter material in filtering a flow of liquid to be filtered, but are particularly useful when immersed in a body of randomly circulating liquid, such as a heated vat of spent cooking oil, or a keg or glass of wine. It will be recognized that the use of packets permits the filter material to be removed in a relatively large body, and when used in a pool of liquid, by straining or ladeling. Since there is no predominant direction of flow for the liquid in a pool, the filter media is not forced against the walls of the packet to become closely packed and restrict flow as is the case with mechanical straining.

The inventor utilizes a process in which a mass of granulated filtering material which takes up the unwanted constituents of an edible liquid is placed in a packet with walls sufficiently porous to permit the liquid to be filtered to freely pass through the walls, but the walls of the packet are impermeable with respect to the filter material. The packet is thereafter closed to retain the filtering material therein. Thereafter, the closed packet containing filtering material is placed in a body of the liquid to be filtered and maintained in the liquid for a period of time, such as 5 minutes. Preferably the liquid is agitated during this period of time, and may be under boiling conditions. As a result, the liquid penetrates the packet and the filter material within the packet, thereby permitting the unwanted constituents of the liquid to be taken up in the filtering material within the packet. After the period of time lapses, the packet is removed from the body of liquid, the liquid thus being conditioned or rejuvenated.

The packet may also be utilized to add ingredients to the liquid being reconditioned or treated. In reconditioning spent cooking oil, it is desirable to add an antioxident to the oil, and the antioxident is preferably mixed with the filter media in the packet.

The inventor has also provided a novel filter material for use in the packets. The filter material should provide sufficient porosity without the need for a filter aid, since the filter aid takes up needed space in the packet. In addition, the filtering material according to the present invention facilitates the flow of the edible liquid through the filter packet. The filter material is hydrated, that is, provided with absorbed and adsorbed water, and to some extent free water. Accordingly, when the packet is immersed in cooking oil at a temperature above the boiling point of water, the water within the packet is converted to steam. As the steam escapes from the packet, it lowers the pressure within the packet to facilitate the flow of the edible liquid into and through the filter packet. The filter material, as result, in effect pumps the edible liquid into the filter packet.

The inventor has found that a mixture of synthetic hydrated amorphous silica and calcined magnesium oxide forms a filter media which functions in a superior manner and which is preferred in packets. The synthetic hydrated amorphous silica has the chemical notation $SiO_2 \cdot XH_2O$, where X is 10% to 85%. The product is commercially available from the Davison Chemical Division of W. R. Grace & Co. under the product name Silica III. Synthetic amorphous silica contains no crystalline silica, such as quartz, cristobalite or tridymite. It is a dry white powder, insoluble in water, having a density of about 30 pounds per cubic foot and contains between 99 and 99.6% $SiO_2$.

Magnesium oxide has the formula MgO and is a white odorless powder, 80% of which will pass through a 100 mesh screen. It also is not soluble in water.

Preferably, the synthetic amorphous silica is hydrated 75-80% by weight, and when a packet containing a mixture of hydrated synthetic amorphous silica and magnesium oxide is immersed in cooking oil at a temperature in excess of the boiling point of water, and preferably on the order of 200° C., the steam formed by the water adsorbed on the synthetic amorphous silica not only physically causes the flow of cooking oil through the filter pack, but also functions to rejuvenate spent cooking oil. The cooking oil could be heated to a temperature between 200°-500° F. for the cooking prior to the filtering. The presence of steam in the cooking oil facilitates removal of volatile ingredients in the cooking oil, but more importantly, the formation of steam from the adsorbed moisture frees OH bonds in the silicate to facilitate polar attraction of undesirable ingredients within the spent cooking oil.

DESCRIPTION OF THE DRAWINGS

To aid understanding the present invention, reference is made to the following drawings.

Figure 1:
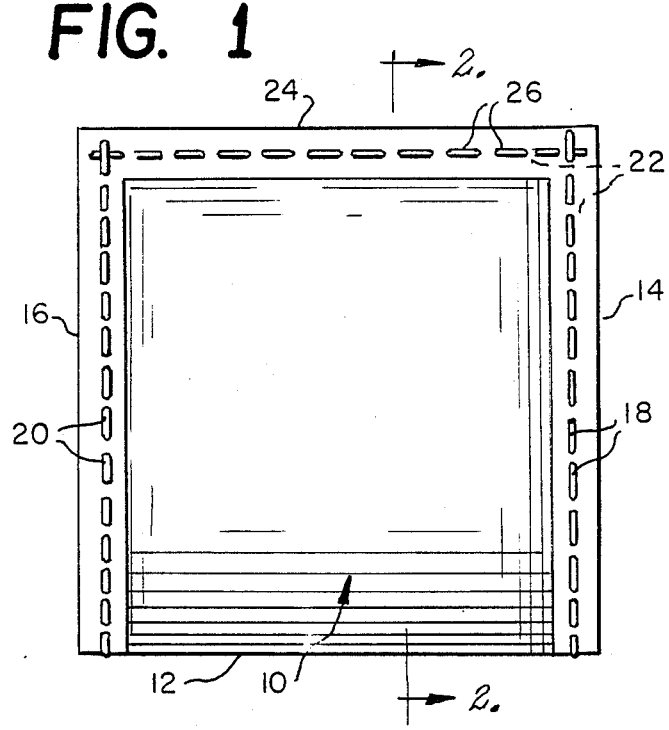
FIG. 1 is a front elevational view of a packet constructed according to the teachings of the present invention.
Figure 2:
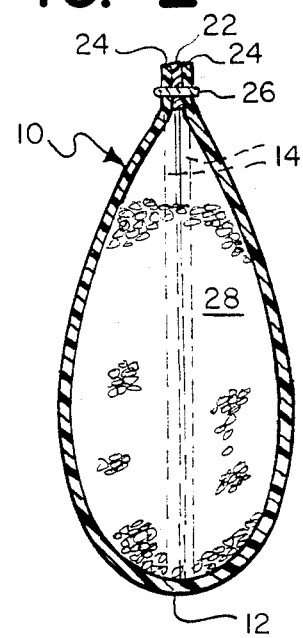
FIG. 2 is a sectional view of the packet of FIG. 1 taken along the line 2—2 of FIG. 1.

In the embodiment of FIGS. 1 and 2, the packet is formed of a rectangular elongated sheet 10 of porous material which is folded over along its central transverse axis indicated at 12. A narrow strip of both outer edges 14 and 16 are sealed together, by a rows 18 and 20 of stitches respectively, and by a layer of adhesive 22 in the form of a narrow strip extending from the edges 14, 16 to the rows 18 and 20.

After the edges 14 and 16 are sealed together, the edge 24 opposite the fold 12 is open, and a mass of filtering material 26 in the form of granules is poured through the open edge 24 into the cavity formed by the fold 12 and sealed edges 14 and 16. Thereafter, the layer of adhesive 22 is extended in a narrow strip along the inner surfaces of the sheet 10 adjacent to the edges 24, and a row 26 of stitches is placed along the upper edge 24 to completely close the packet and trap the granulated filtering material 28 therein. It will be noted that the granulated filtering material 28 substantially, but not completely, fills the cavity within the sheet 10 of porous material.

The filter material 28 is selected to take up the contaminants which exist in the liquid to be rejuvenated, clarified or refined. The contaminants may be absorbed into the filtering material or attracted by polar attraction, or some other mechanism not fully understood. Spent cooking oil may be rejuvenated with a filtering material consisting of 80% hydrated synthetic amorphous silica, 10% synthetic amorphous magnesium silicate, 9% diatomaceous earth, and 1% synthetic amorphous silica-alumina as disclosed in the U.S. Pat. No. 4,764,384 of John Gyann, entitled FILTERING MEDIA AND METHOD OF MAKING SAME, and this material is suitable for the granulated filtering material 28 of the present invention. I prefer to use for the filtering media 28 a mixture of hydrated synthetic amorphous silica and granular calcined magnesium oxide as further described above as the filtering media 28, particularly for the purpose of rejuvenating spent cooking oil.

The filter packet of FIGS. 1 and 2 may also be utilized to upgrade or recondition many types of liquid including removing undesirable taste constituents from fruit juices, coffees and teas, water, beer, spirits and other consumable liquids. When the filtering packet is utilized to upgrade inexpensive wine, I have found that a mixture of 75% synthetic amorphous hydrated silica and 25% diatomaceous earth by weight produces excellent results.

The sheet 10 of porous material is preferably sufficiently porous to permit free circulation of the liquid to be filtered but to prevent the filtering media 28 from escaping from the cavity formed by the packet. Paper or cloth have been found to be suitable materials for the packet. Paper of the constituency of conventional filter paper is satisfactory for the sheet 10. Any porous sheet material which is inert to the liquid to be filtered and which may be sealed into a packet can be used for the sheet, but cloth or paper have been found to be most satisfactory because of the ease with which the packet can be formed by sewing, or gluing, or both.

The rows of stitches 18, 20 and 26 may be eliminated from the construction of the packet if the layer 22 of adhesive will form a durable tight seal at the perimeter of the packet. The inventor has found that a monovalent metal silicate is a suitable adhesive for the layer 22 and requires no stitching. Added security can of course be achieved by using the layer 22 or adhesive with the rows of stitches 18, 20 and 26.

The packets may be of any size, but are preferably sufficiently small that the liquid being filtered maintains good contact with all of the filtering media within the packet.

A specific example of a packet constructed according to the present invention contains one ounce of filtering media and a porous paper packet constructed as shown in the drawings utilizing an adhesive consisting of 85% by weight sodium silicate and 15% by weight talcum powder and rows 18, 20 and 26 of stitches, as illustrated. The sheet 10 is of sufficient size that the filtering media occupies approximately 80% of the cavity formed within the packet. The filtering media itself consists of approximately 70% synthetic amorphous silica which has been hydrated and 30% magnesium oxide by weight. The water associated with the synthetic amorphous silica constitutes 80% of the dry weight of the synthetic amorphous silica. The synthetic amorphous silica is obtained from the Davison Chemical Division of W. R. Grace Company under the tradename Silica Gel and is a dry white powder with a density of approximately 30 pounds per cubic foot and a particle size averaging between 30 and 40 microns.

Sodium silicate or potassium silicate are particularly desirable materials for the adhesive since it will withstand high temperature and an atmosphere of cooking oil. The adsorbed moisture in the sodium silicate or potassium silicate transfers to the paper layer 10 or cloth layer 10 to cause the adhesive to set, and at elevated temperatures the adhesive becomes glasslike and insoluble.

It is desirable to add certain ingredients to spent cooking oil in the rejuvenating process. One such ingredient is an antioxidant, an antioxidant in the form of palmate, or tochopherols may be mixed into the filter media and will pass through the packet into the spent cooking oil during the rejuvenating process. Also, it may be desirable in some cases to add activated carbon into the packet to facilitate clarification of spent cooking oil. The inventor has found that a quantity of activated carbon equal to approximately 10% by weight of the filter media may be added into the filter media of the packet with improved filtering of some types of spent cooking oils. One percent by weight of palmate or tochopherols may be added to the filtering media to transfer antioxidant into spent cooking oil to extend the useful life of the cooking oil beyond that achieved by mere filtration.

Figure 3:
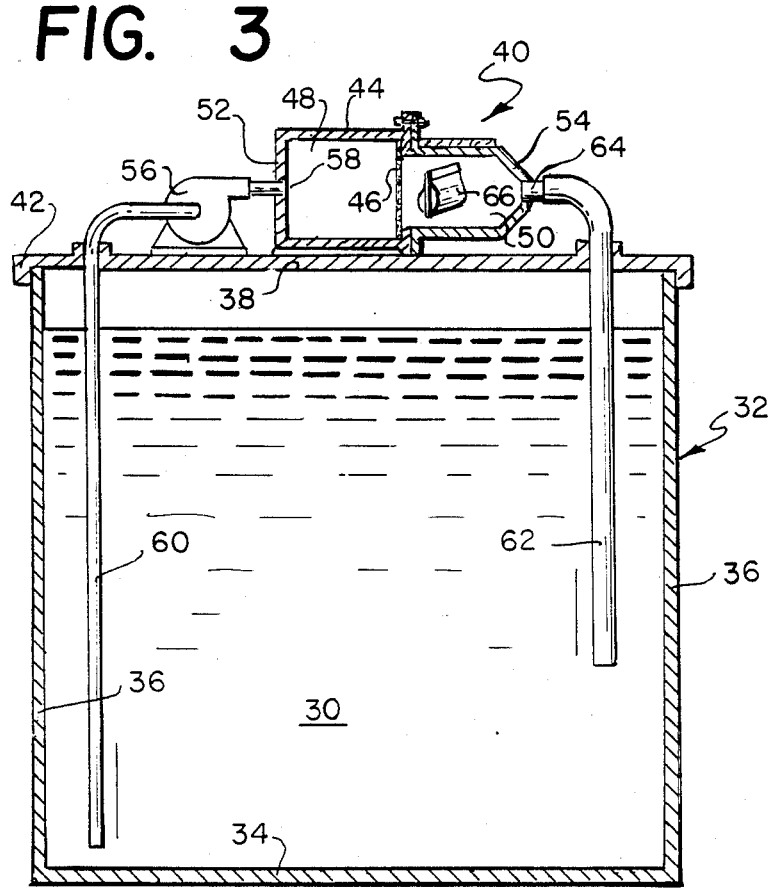
FIG. 3 is a somewhat diagrammatical view of a cooker for a fast food industry provided with a cooking oil filter and rejuvenator constructed in accordance with the teachings of the present invention.

FIG. 3 illustrates a portable unit for filtering and rejuvenating the cooking oil of a deep fat fryer which is not provided with a drain. Similar equipment can be provided for cookers provided with a drain or for permanent installations with deep fat fryers. As illustrated, the deep fat fryer is shown at 30, and comprises a tank 32 having a bottom 34 and side walls 36. The upper end of the tank 38 is open, and adapted to receive a basket for the cooking process.

In accordance with the present invention, FIG. 3 illustrates a portable filter machine 40 positioned on the cooker 30. The portable filter machine has a cover 42 which extends completely over the open end 38 in order to minimize the contact of air on the surface of the cooking oil and to prevent steaming and spattering of oil out of the vessel 32.

The filter machine has an elongated cylindrical housing 44 mounted on the opposite side of the cover 42 from the fryer vessel 32, and the housing is provided with a central vertical screen 46. The screen 46 divides housing into an intake chamber 48 and an exhaust chamber 50. The chambers 48 and 50 are provided with end walls 52 and 54 which form fluid-tight seals.

A pump 56 is mounted on the cover 42 adjacent to the end wall 52, and the pump communicates with the intake chamber 58 through an aperture 58 in the wall 52. A flexible intake hose 60 extends from the inlet end of the pump down into the vessel 32 and terminates adjacent to the bottom 34 thereof.

In like manner, a second tube 62 is sealed through an opening 64 in the wall 54 to communicate with the exit chamber 50. A filter packet 66 is disposed within the exit chamber 50. The filter packet 66 is identical in construction to that described in FIG. 1 and described in detail heretofore.

The pump 56 is an electrically-driven pump, and on excitation of the pump 56, spent cooking oil from the vessel 32 is pumped through the flexible tube 60 and the pump 56 into the intake chamber 48. The spent cooking oil flows through the screen 46, leaving particles of food and the like in the intake chamber. In the exit chamber, the oil is subjected to the filtering action of the filter packet, and is rejuvenated before being returned to the vessel 32 through the flexible tube 62.

The effectiveness of the filtering device depends upon a sufficient residence time for the spent cooking oil in the exit chamber. The residence time is controlled by the pump 56, and the pump 56 is a variable speed pump which allows the operator to adjust the residence time of the spent cooking oil in the exit chamber. If the pump operates at a relatively high rate, the spent cooking oil must be circulated through the intake chamber 48 and exit chamber 50 a relatively large number of times in order to become rejuvenated, whereas, the number may be greatly reduced by slowing down the speed of the pump 56.

After the spent cooking oil is rejuvenated, the portable filter mechanism illustrated in FIG. 3 is removed from the vessel 32. The housing 44 may be disassembled to clean the screen 46 and to replace the filter packet 66 with a fresh filter packet.

Figure 4:
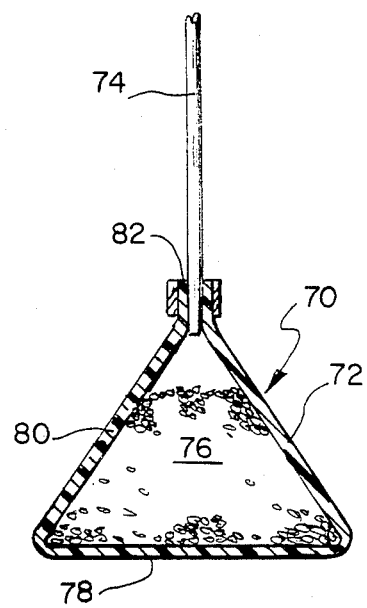
FIG. 4 is a vertical sectional view of another embodiment of a packet constructed according to the present invention for use in conditioning wine, soft drinks or other edible liquids.

FIG. 4 illustrates another embodiment of the present invention which is intended to clarify, or remove taste ingredients from a relatively small body of liquid, such as a glass of wine or fruit juice. The device consists of a packet 70 formed of a porous wall 72 and mounted on a handle or stick 74. The packet 70 contains a mass 76 of filter material which is identical to the filter material 28 illustrated in FIG. 2. Likewise, the wall 72 is identical to the sheet 10 of FIG. 2.

The packet 70 has a flat circular base 78 which is adapted to rest upon the bottom of a glass or the like. A conical portion 80 of the wall 72 extends from the perimeter of the base 78 to a cylindrical anchoring section 82 which is cemented or otherwise secured on the stick 74.

The bitter tasting components of an inexpensive wine, or of a fruit juice, can be substantially reduced by merely placing the filter mechanism of FIG. 4 in a glass or other container of the material and agitating the device to cause flow of the liquid through the filter material.

There are many other constructions and applications for a filtering mechanism utilizing the filter material disclosed herein. There are also many applications for a filter packet beyond that set forth herein, and the foregoing examples are illustrative of the uses that those skilled in the art will develop. It is, therefore, intended that the scope of the present invention be not limited by the foregoing specification, but rather only by the appended claims.

The invention claimed is:

1. The method of removing unwanted constituents from a body of edible liquid comprising the steps of immersing a closed packet containing a mass of granulated filtering material comprising hydrated synthetic amorphous silica in a body of edible liquid, the filtering material being adapted to adsorb the unwanted constituents, the closed packet having a wall of material pervious to the edible liquid and substantially impervious to the filtering material, thereafter maintaining the packet in the body of edible liquid for a period of time, whereby the unwanted constituents of the body of edible liquid are adsorbed in the mass of filtering material within the packet, and thereafter removing the closed packet with its contents from the body of edible liquid.

2. The method of removing unwanted constituents from a body of edible liquid comprising the steps of claim 1 in combination with the step of agitating the edible liquid to increase circulation thereof within the body.

3. The method of removing the unwanted constituents from a body of edible liquid comprising the steps of claim 1 wherein the granular filtering material comprises granular magnesium oxide and synthetic amorphous silica.

4. The method of removing contaminants from a body of cooking oil comprising the steps of claim 1 wherein the liquid is a body of cooking oil.

5. The method of removing contaminants from a body of cooking oil comprising the steps of claim 4 in combination with the step of heating the cooking oil to a temperature between 200° F. and 500° F. before placing the closed packet in the cooking oil.

6. The method of removing contaminants from a body of cooking oil comprising the steps of claim 5 wherein the granulated filtering material comprises granular magnesium oxide, and synthetic amorphous silica having adsorbed water between 10 and 85 percent by weight of the amorphous silica.

7. The method of cooking food items comprising the steps of heating a body of edible cooking oil to a temperature between 200° F. and 500° F. in a vessel open at the top, thereafter immersing the food item in the hot cooking oil for a period sufficient to effect cooking, whereby the cooking oil becomes contaminated with fatty acids and other contaminants, and performing the steps of claim 1 to remove the contaminants from the cooking oil.

8. The method of rejuvenating used cooking oil containing contaminants comprising the steps of placing a mass of granulated hydrated filtering material which adsorbs the contaminants of the used cooking oil on contact in a packet having walls impermeable to the granulated filtering material and permeable to the used cooking oil, closing the packet to trap the filtering material therein, thereafter placing the closed packet with trapped filtering material in a body of used cooking oil, whereby the used cooking oil will penetrate the packet and contact the filtering material, heating the body and packet to a temperature above 100° C., maintaining the packet in the body of used cooking oil at a temperature above 100° C. for a period of at least five minutes, whereby water of hydration will be driven off of the filtering material as steam and a portion of the contaminants of the cooking oil will be absorbed in the filtering material within the packet, and thereafter removing the packet and its contents from the body of used cooking oil.

9. The method of treating spent cooking oil comprising the steps of claim 8 preceded by the step of heating the cooking oil to a temperature between 200° F. and 500° F.

10. A method of treating spent cooking oil comprising the steps of claim 9 wherein the step of placing a mass of granulated hydrated filtering material in a packet is limited to placing a material comprising granular magnesium oxide and synthetic amorphous silica having adsorbed water between 10 and 85% by weight of the amorphous silica in the packet.

* * * * *